United States Patent [19]

Spencer, III

[11] Patent Number: 5,171,332

[45] Date of Patent: Dec. 15, 1992

[54] METHOD OF IMPREGNATING POROUS ABRASIVE MEDIA

[75] Inventor: James T. Spencer, III, Greensboro, N.C.

[73] Assignee: Wrangler, Greensboro, N.C.

[21] Appl. No.: 776,984

[22] Filed: Oct. 15, 1991

[51] Int. Cl.$^5$ .............................................. C09C 1/68
[52] U.S. Cl. ....................................... 51/295; 51/307; 8/108.1; 8/111
[58] Field of Search ......................... 51/293, 295, 307; 8/505, 107, 108.1, 111

[56] References Cited

U.S. PATENT DOCUMENTS 4,816,033 7/1989 Hoffer et al. ........................... 8/158
4,850,156 7/1989 Bellaire ................................. 51/293

*Primary Examiner*—Mark L. Bell
*Assistant Examiner*—Deborah Jones
*Attorney, Agent, or Firm*—Rhodes, Coats & Bennett

[57] ABSTRACT

A method for impregnating porous abrasive media with a reactive solution for use in distressing fabric and the product produced thereby. The method includes the steps of placing the porous abrasive media and the reactive solution in a chamber; evacuating the pressure in said chamber to obtain a pre-selected pressure level; restoring the pressure in said chamber; and repeating the steps of evacuating and restoring the pressure a sufficient number of times to impregnate the porous abrasive media with the reactive solution. The impregnate media is then removed from the chamber.

15 Claims, 3 Drawing Sheets

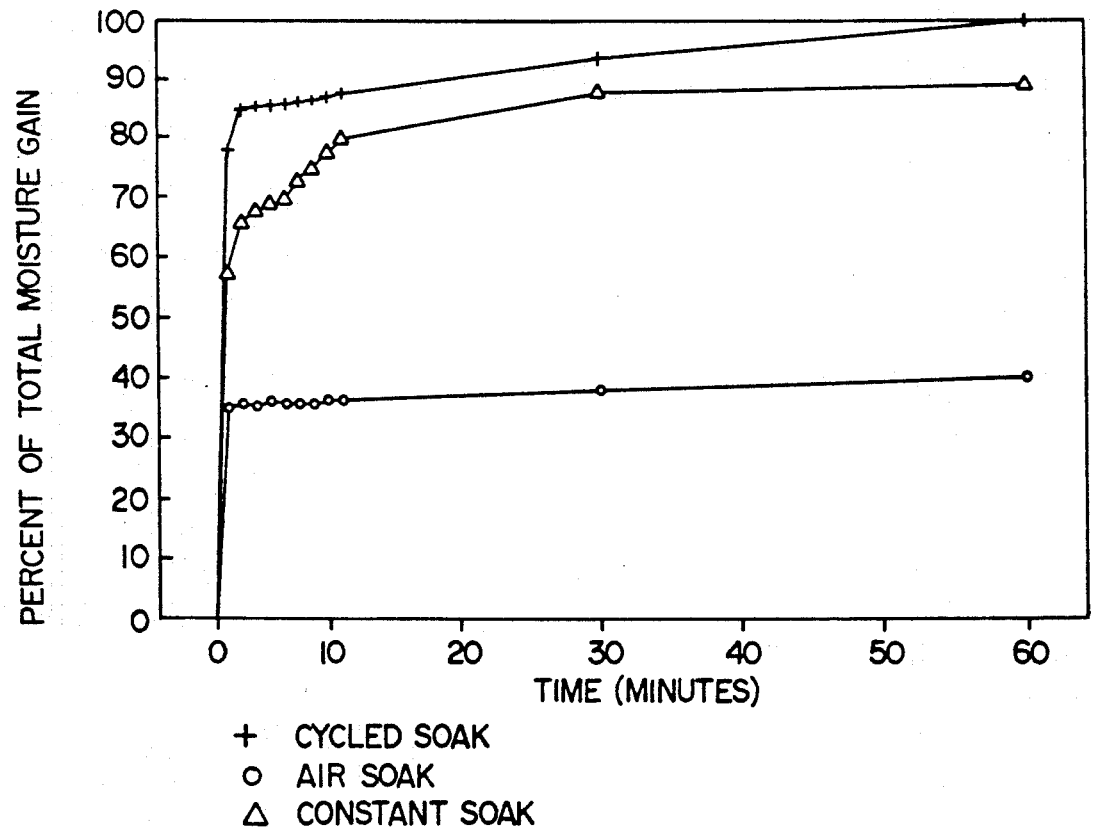

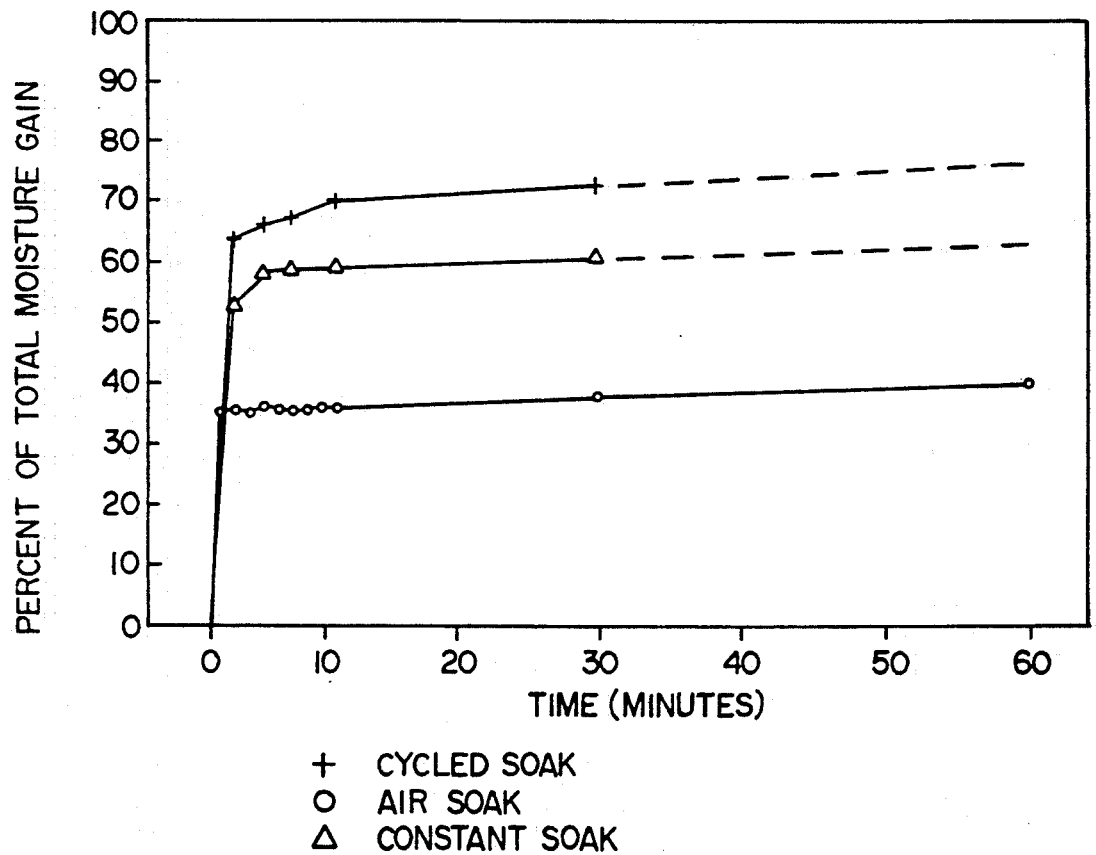

METHOD OF IMPREGNATING POROUS ABRASIVE MEDIA

BACKGROUND OF THE INVENTION (1) Field of the Invention

The present invention relates generally to a method of impregnating porous abrasive media with a liquid and, more particularly, to a method for impregnating porous abrasive media with a reactive solution for use in distressing fabric and the product produced thereby.

(2) Description of the Prior Art

"Stone washing" generally consists of exposing the garments, such as denim jeans, to a porous abrasive media which has been impregnated with a reactive solution such as an aqueous solution of either potassium or sodium permanganate or sodium hypochlorite. The treatment process achieves a softening as well as a pre-faded condition which is desirable.

One of the problems with stone washing relates to the difficulty of getting the reactive solution to completely impregnate the porous abrasive media. The porous abrasive media is generally lighter than the reactive solution and thus floats on the solution. The media has previously been placed in buckets and forced down in the solution so that the solution impregnates the rock. However, because this process was carried on ambient pressure, some air was trapped in the porous abrasive media and prevented the reactive solution from completely penetrating the media.

As a result, it has become common practice to employ vacuum to assist in impregnating the porous abrasive media for stone washing. Two examples of this process are shown in U.S. Pat. Nos. 4,816,033, issued to Hoffer et al., and 4,850,156, issued to Bellaire. The entire disclosure of these patents are hereby incorporated by reference.

The Hoffer patent discloses a technique by which pumice rock is impregnated with potassium permanganate solution by placing the rock in a sealed chamber, drawing a vacuum in the chamber, spraying a potassium permanganate solution in to the chamber while the vacuum drops to a preselected level, and then retrieving the impregnated rock from the chamber.

The Bellaire patent discloses a method of preparing porous abrasive rock for use in distressing fabric by the steps of impregnating the rocks placed in a vacuum vessel with a bleaching solution under reduced pressure, maintaining the reduced pressure for a first interval while injecting the solution beneath the rocks and then increasing the vessel pressure to approximately ambient prior to removal.

While the techniques taught by Hoffer and Bellaire are useful, there are some limitations. Specifically, the time required to impregnate the porous abrasive media is generally about 15-25 minutes. Since this is a batch-type process, the time required limits the amount of media which can be impregnated. In addition, it has been surprisingly discovered that repeated vacuum cycles result in a higher impregnation level in less time than the techniques taught by either Hoffer or Bellaire. This higher impregnation level results in superior stone washing results.

Thus, there remains a need for a new and improved method for impregnating porous abrasive media with reactive solution which requires less time to impregnate the rock and, in addition, results in a higher degree of impregnation.

SUMMARY OF THE INVENTION

The present invention is directed to a method for impregnating porous abrasive media with a reactive solution for use in distressing fabric. The method includes the steps of placing the porous abrasive media and the reactive solution in a chamber; evacuating the pressure in the chamber to obtain a pre-selected pressure level; restoring the pressure in the chamber; and repeating the steps of evacuating and restoring the pressure a sufficient number of times to impregnate the porous abrasive media with the reactive solution. The impregnated media is then removed from the chamber.

Preferably, the reactive solution is introduced at ambient pressure and at a level sufficient to cover the porous abrasive media. Also, in the preferred embodiment the pre-selected vacuum level is between about 10 and 30 inches of Hg, and most preferably is about 25 inches of Hg. The pre-selected vacuum level is reached in about 2 minutes in a full size commercial unit.

The pressure in the chamber is restored to approximately ambient pressure in the preferred embodiment and is accomplished by introducing compressed air into the chamber. The time interval to restore the pressure in the chamber is about 30 seconds in a full size commercial unit. The steps of evacuating and restoring the pressure in the chamber may be repeated a total of between 1 and 10 times. Preferably, it is repeated a total of 5 times. This results in a total cycle time of about 12½ minutes in a full size commercial unit. Additional reactive solution may be introduced into the chamber prior to repeating the steps of evacuating and restoring the pressure in the chamber.

Accordingly, one aspect of the present invention is to provide a method for impregnating porous abrasive media with a reactive solution for use in distressing fabric. The method includes the steps of: (a) placing the porous abrasive media and the reactive solution in a chamber; (b) evacuating the pressure in the chamber to obtain a pre-selected pressure level; (c) restoring the pressure in the chamber; and (d) repeating steps (b) and (c) a sufficient number of times to impregnate the porous abrasive media with the reactive solution.

Another aspect of the present invention is to provide a method for impregnating porous abrasive media with a reactive solution for use in distressing fabric. The method includes the steps of: (a) placing the porous abrasive media in a chamber; (b) introducing the reactive solution into the chamber; (c) evacuating the pressure in the chamber to obtain a pre-selected pressure level; (d) restoring the pressure in the chamber to approximately ambient; (e) repeating steps (c) and (d) a sufficient number of times to impregnate the porous abrasive media with the reactive solution; and (f) removing the impregnated porous abrasive media from the chamber.

Another aspect of the present invention is to provide a method for impregnating porous abrasive media with a reactive solution for use in distressing fabric. The method includes the steps of: (a) placing the porous abrasive media in a chamber; (b) reducing the pressure in the chamber to a reduced pressure which is less than ambient pressure; (c) introducing the reactive solution into the chamber; (d) evacuating the pressure in the chamber to obtain a pre-selected pressure level; (e) restoring the pressure in the chamber to approximately ambient; (f) repeating steps (d) and (e) a sufficient number of times to impregnate the porous abrasive media with the reactive solution; and (g) removing the impregnated porous abrasive media from the chamber.

Another aspect of the present invention is to provide porous abrasive media for use in distressing denim produced by the process of: (a) placing the porous abrasive media in a chamber; (b) introducing a reactive solution into the chamber; (c) evacuating the pressure in the chamber to obtain a pre-selected pressure level; (d) restoring the pressure in the chamber to approximately ambient; (e) repeating steps (c) and (d) a sufficient number of times to impregnate the porous abrasive media with the reactive solution; and (f) removing the impregnated porous abrasive media from the chamber.

Still another aspect of the present invention is to provide porous abrasive media impregnated with a reactive solution for use in distressing fabric. The media is impregnated at greater than between about 85 and 100 percent of the theoretical maximum level of impregnation.

These and other aspects of the present invention will become apparent to those skilled in the art after a reading of the following description of the preferred embodiment when considered with the drawings.

BRIEF DESCRIPTION OF THE DRAWINGS

FIG. 2 is a graphical representation of a comparison of the present invention to prior art methods of impregnating the porous abrasive media at 25 inches of Hg; and FIG. 3 is a graphical representation of a comparison of the present invention to prior art methods of impregnating the porous abrasive media at 15 inches of Hg.

DESCRIPTION OF THE PREFERRED EMBODIMENTS

Figure 1:
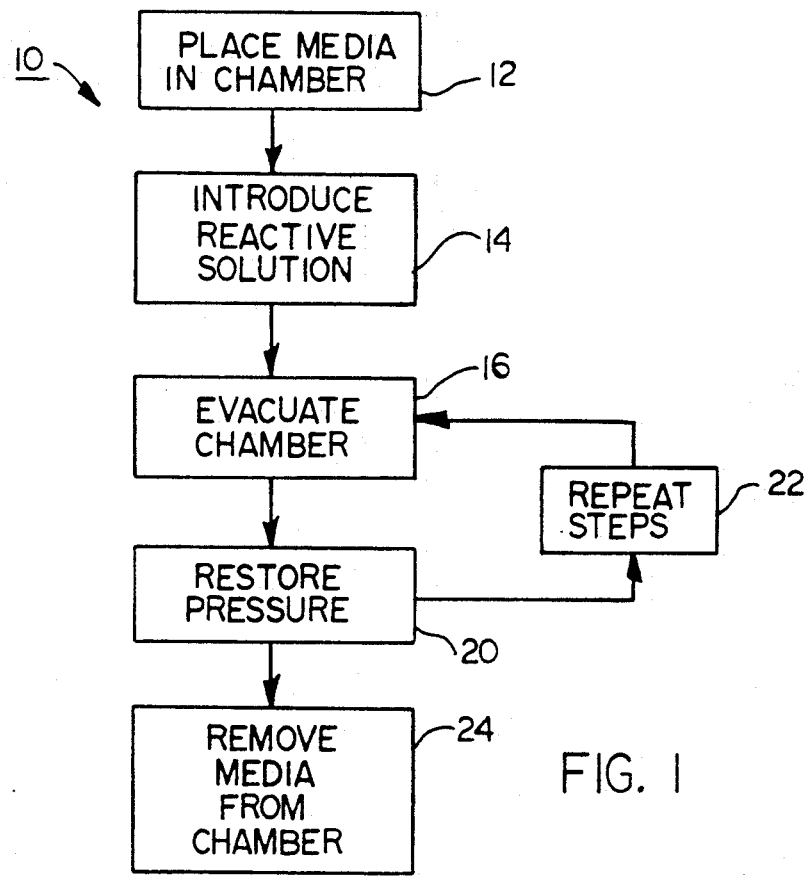
FIG. 1 is a flow diagram illustrating the method of the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto.

As best seen in FIG. 1, there is shown a flow diagram, generally designated 10, of the method of the present invention. The porous abrasive media is first placed in a chamber. The media may be either in open mesh bags or may be first placed into open mesh steel baskets. The reactive solution is then introduced into the chamber. Preferably the reactive solution is introduced at ambient pressure in a level sufficient to cover the media. The chamber is then evacuated to a preselected vacuum level of between 10-30 inches mercury. Preferably, the vacuum level is about 25 inches of mercury. The preselected vacuum is reached in about two minutes in a full size commercial unit of between 100 and 300 gallons.

The pressure in the chamber is restored to approximately ambient pressure and is accomplished by introducing compressed air into the chamber. The time interval to restore the pressure in the chamber is about 30 seconds in a full size commercial unit. The steps of evacuating and restoring the pressure in the chamber may be performed a total of between one and ten times. Preferably, it is performed a total of five times. This results in a total cycle time of about 12½ minutes in a full size commercial unit. Additional reactive solution may be introduced into the chamber prior to repeating the steps of evacuating and restoring the pressure in the chamber.

The process and products according to the present invention will become more apparent on reviewing the following detailed examples.

EXAMPLES 1-10

Small samples of pumice stone weighing approximately 65 to 270 grams were submerged at ambient air pressure in a 0.5% to 5.0% 5 wt.% solution of potassium permanganate for various periods of time between 30 seconds and 60 minutes. After soaking, the stone was weighted and the percent weight gain calculated as a percent of complete saturation. As used here, complete saturation was defined as being reached after 16 cycles of evacuation and ambient pressure over a 60 minute period. The results are shown in Table 1 and FIG. 2.

TABLE 1

| Percent Weight Gain vs. Time at Ambient Pressure | | |
|---|---|---|
| Example No. | Time | % Wt. Gain |
| 1 | 30 sec. | — |
| 2 | 1 min. | 35.4 |
| 3 | 2 min. | 35.9 |
| 4 | 4 min. | 35.7 |
| 5 | 6 min. | — |
| 6 | 8 min. | 35.4 |
| 7 | 10 min. | — |
| 8 | 12 min. | — |
| 9 | 30 min. | 38.1 |
| 10 | 60 min. | 39.9 |

EXAMPLES 11-20

Small samples of pumice stone weighing approximately 65 to 270 grams were submerged in a 0.5 to 5 wt. % solution of potassium permanganate in a sealed 4 gallon vessel evacuated to 25 inches of Hg for various periods of time between 30 seconds and 60 minutes. After soaking, the stone was weighted and the percent weight gain calculated as a percent of complete saturation. The results are shown in Table 2 and FIG. 2.

TABLE 2

| Percent Weight Gain vs. Time at 25" of Hg | | |
|---|---|---|
| Example No. | Time | % Wt. Gain |
| 11 | 30 sec. | 57.5 |
| 12 | 1 min. | 65.9 |
| 13 | 2 min. | 69.1 |
| 14 | 4 min. | 69.7 |
| 15 | 6 min. | 72.9 |
| 16 | 8 min. | 75.0 |
| 17 | 10 min. | 77.7 |
| 18 | 12 min. | 80.2 |
| 19 | 30 min. | 88.1 |
| 20 | 60 min. | 89.2 |

EXAMPLES 21-28

Small samples of pumice stone weighing approximately 65 to 270 grams were submerged in a 0.5 to 5 wt. % solution of potassium permanganate in a sealed 4 gallon vessel evacuated to 25 inches of Hg for various periods of time between 30 seconds and 60 minutes. During the soaking cycle the vessel was repeatedly returned to about ambient pressure and then re-evacuated. After soaking, the stone was weighted and the percent weight gain calculated as a percent of complete saturation. The results are shown in Table 3 and FIG. 2.

TABLE 3

Percent Weight Gain vs. Time at 25" of Hg for Multiple Vacuum Cycles

| Example No. | Time | Cycles | % Wt. Gain |
| --- | --- | --- | --- |
| 21 | 30 sec. | 2 | 78.0 |
| 22 | 1 min. | 4 | 84.8 |
| 23 | 2 min. | 5-8 | 85.4 |
| 24 | 4 min. | 5-16 | 85.6 |
| 25 | 10 min. | 5-16 | 86.7 |
| 26 | 12 min. | 5-16 | 87.6 |
| 27 | 30 min. | 5-16 | 93.6 |
| 28 | 60 min. | 16 | 100.0 |

Results of the above examples can best be seen in FIG. 2 which is a graphical comparison of the prior art methods impregnating porous abrasive media to the present invention at 25 inches of Hg. As can be seen, porous abrasive media impregnated at ambient pressure by being submerged in the reactive solution quickly reach about 35 wt. % saturation in about 2 minutes. However, even after 60 minutes only about 40 wt. % saturation is reached. Apparently, because of trapped air in the porous abrasive media, full saturation can never be reached.

Porous abrasive media treated by vacuum assisted techniques such as disclosed by Hoffer and Bellaire reach a higher saturation in less time than at ambient pressure since much of the trapped air has been removed prior to introducing the reactive solution. However, as can also be seen, the technique of the present invention of repeated cycles of vacuum and pressure results both in a substantial decrease in the time required to reach equal saturation and, in addition, more complete saturation can be obtained. While the mechanism for this improvement is not fully understood, it is believed that it may be analogous to squeezing a sponge many times under water as compared to simply holding the sponge under water. Similar results are shown for lower vacuums in the range of 15 inches of Hg as shown in the following examples.

EXAMPLES 29-35

Small samples of pumice stone weighing approximately 65 to 270 grams were submerged in a 0.5 to 5 wt. % solution of potassium permanganate in a sealed 4 gallon vessel evacuated to 15 inches of Hg for various periods of time between 30 seconds and 60 minutes. After soaking, the stone was weighted and the percent weight gain calculated as a percent of complete saturation. The results are shown in Table 4 and FIG. 3.

TABLE 4

Percent Weight Gain vs. Time at 15" of Hg

| Example No. | Time | % Wt. Gain |
| --- | --- | --- |
| 29 | 30 sec. | — |
| 30 | 1 min. | 53.0 |
| 31 | 2 min. | 58.3 |
| 32 | 6 min. | 58.9 |
| 33 | 12 min. | 59.5 |
| 34 | 30 min. | 61.0 |
| 35 | 60 min. | — |

EXAMPLES 36-42

Small samples of pumice stone weighing approximately 65 to 270 grams were submerged in a 0.5 to 5 wt. % solution of potassium permanganate in a sealed 4 gallon vessel evacuated to 15 inches of Hg for various periods of time between 30 seconds and 60 minutes. During the soaking cycle the vessel was repeatedly returned to about ambient pressure and then re-evacuated. After soaking, the stone was weighted and the percent weight gain calculated as a percent of complete saturation. The results are shown in Table 5 and FIG. 3.

TABLE 5

Percent Weight Gain vs. Time at 15" of Hg for Multiple Vacuum Cycles

| Example No. | Time | Cycles | % Wt. Gain |
| --- | --- | --- | --- |
| 36 | 30 sec. | 2 | — |
| 37 | 1 min. | 4 | 64.1 |
| 38 | 2 min. | 5-8 | 66.1 |
| 39 | 6 min. | 5-16 | 67.1 |
| 40 | 12 min. | 5-16 | 70.0 |
| 41 | 30 min. | 5-16 | 72.6 |
| 42 | 60 min. | 5-16 | — |

As can be seen, at 15 inches of Hg both the prior art and the present invention are not as efficient as at 25 inches of Hg. However, a comparison of Table 2 and Table 5 shows that multiple cycling according to the present invention at 15 inches of Hg is substantially equivalent to the prior art at 25 inches of Hg. Since 15 inches of Hg requires a much lower investment in equipment and energy than 25 inches of Hg, cycling at 15 inches of Hg produces substantial economic benefit over the prior art.

Certain modifications and improvements will occur to those skilled in the art upon reading of the foregoing description. By way of example, the chamber could first be evacuated prior to introducing the reactive solution thereby further reducing the time necessary to impregnate the porous abrasive media. Also, increasing the vacuum from 25 to 29.92 inches of Hg should further reduce the time required to achieve equivalent saturation similar to the improvement noted in increasing the vacuum from 15 to 25 inches of Hg. It should be understood that all such modifications and improvements have been deleted herein for the sake of conciseness and readability but are properly within the scope of the following claims.

We claim:

1. A method for impregnating porous abrasive media with a reactive solution for use in distressing fabric, said method comprising:
   (a) placing the porous abrasive media and the reactive solution in a chamber;
   (b) evacuating the pressure in said chamber to obtain a first vacuum level;
   (c) restoring the pressure in said chamber to ambient by introducing air into said chamber; and
   (d) repeating steps (b) and (c) a sufficient number of times to impregnate the porous abrasive media with the reactive solution.

2. The method according to claim 1, further including the steps of:
   (e) restoring the pressure in said chamber to approximately ambient; and
   (f) removing the impregnated porous abrasive media from said chamber.

3. The method according to claim 1, wherein the step of introducing the reactive solution is at ambient pressure.

4. The method according to claim 3, wherein the reactive solution is introduced at a level sufficient to cover the porous abrasive media.

5. The method according to claim 1, wherein the vacuum level is between about 10 and 30 inches of Hg.

6. The method according to claim 5, wherein the vacuum level is about 27 inches of Hg.

7. The method according to claim 6, wherein time interval to reach the vacuum level is about 2 minutes.

8. The method according to claim 1, wherein the step of restoring the pressure in said chamber is to approximately ambient pressure.

9. The method according to claim 1, wherein the step of restoring the pressure in said chamber includes introducing compressed air into said chamber.

10. The method according to claim 9, wherein the time interval to restore the pressure in said chamber is about 30 seconds.

11. The method according to claim 1, wherein steps (b) and (c) are performed a total of between 1 and 10 times.

12. The method according to claim 11, wherein steps (b) and (c) are performed a total of 5 times.

13. The method according to claim 1, further including introducing additional reactive solution into said chamber prior to the step of repeating steps (b) and (c).

14. A method for impregnating porous abrasive media with a reactive solution for use in distressing fabric, said method comprising:

(a) placing the porous abrasive media in a chamber;
(b) introducing the reactive solution into said chamber;
(c) evacuating the pressure in said chamber to obtain a first vacuum level;
(d) restoring the pressure in said chamber to approximately ambient by introducing air into said chamber;
(e) repeating steps (c) and (d) a sufficient number of times to impregnate the porous abrasive media with the reactive solution; and
(f) removing the impregnated porous abrasive media from said chamber.

15. A method for impregnating porous abrasive media with a reactive solution for use in distressing fabric, said method comprising:

(a) placing the porous abrasive media in a chamber;
(b) reducing the pressure in said chamber to a reduced pressure which is less than ambient pressure;
(c) introducing the reactive solution into said chamber;
(d) evacuating the pressure in said chamber to obtain a first vacuum level;
(e) restoring the pressure in said chamber to approximately ambient by introducing air into said chamber;
(f) repeating steps (d) and (e) a sufficient number of times to impregnate the porous abrasive media with the reactive solution; and
(g) removing the impregnated porous abrasive media from said chamber.

* * * * *